United States Patent

Duguay

[15] 3,671,747
[45] June 20, 1972

[54] PICOSECOND OPTICAL APPARATUS UTILIZING OPTICALLY INDUCED BIREFRINGENCE IN SOLIDS

[72] Inventor: Michel Albert Duguay, Summit, N.J.

[73] Assignee: Bell Telephone Laboratories, Incorporated, Murray Hill, Berkely Heights, N.J.

[22] Filed: March 30, 1970

[21] Appl. No.: 23,849

[52] U.S. Cl..............................250/199, 332/7.51, 350/157
[51] Int. Cl. .......................................................H04b 9/00
[58] Field of Search..................250/199; 332/7.51; 350/147, 350/150, 151, 157, 158

[56] References Cited
UNITED STATES PATENTS

| | | | |
|---|---|---|---|
| 3,521,070 | 7/1970 | Duguay et al. | 250/199 |
| 3,492,492 | 1/1970 | Ballman et al. | 350/150 X |
| 3,234,475 | 2/1966 | Giordmaine et al. | 250/199 X |
| 3,516,726 | 6/1970 | Dillon, Jr. | 350/150 X |
| 3,521,068 | 7/1970 | Armstrong et al. | 250/199 |
| 3,435,226 | 3/1969 | Rack | 250/199 |

Primary Examiner—Benedict V. Safourek
Attorney—R. J. Guenther and Arthur J. Torsiglieri

[57] ABSTRACT

Birefringence, optically induced in solid materials by pulses of picosecond duration and high intensity, is utilized in a light gate, an amplitude modulator, a multiplexer and other optical devices.

8 Claims, 3 Drawing Figures

Patented June 20, 1972 3,671,747

INVENTOR
M. A. DUGUAY
BY Michael J. Urbano
ATTORNEY 3,671,747

PICOSECOND OPTICAL APPARATUS UTILIZING OPTICALLY INDUCED BIREFRINGENCE IN SOLIDS

BACKGROUND OF THE INVENTION

This invention relates to optical devices which utilize optically induced birefringence in solid materials.

The future of optical communications systems may rest to a considerable extent upon the development of pulse code transmission systems in which, for example, the optical pulse train generated by a mode-locked laser is encoded with information by the selective elimination of pulses from the train. A device to accomplish such pulse elimination generally takes the form of a gate which presents high or low loss to selected optical pulses in accordance with information to be transmitted. To be effective, however, the gate should have a switching speed, or rise time, shorter than the pulse spacing, which in the case of mode-locked lasers is of the order of several nanoseconds or less. Where optical pulse trains are interleaved, however, as in a multiplexed system, the rise time requirement is even more stringent since the pulse spacing could readily become comparable to the optical pulse width, e.g., a fraction of a picosecond.

Currently available optical tests typically utilize electrooptic devices, such as Pockels cells or Kerr cells, driven by an electronic pulse generator which electronically induces birefringence therein. These gates typically have a rise time of about 0.5 nanoseconds dependent on the capability of the pulse generator, and further appear to be limited by capacitance effects, inherent in the coaxial mounting of the electrooptic crystal, to a minimum rise time of about 50 picoseconds. These restrictions placed on the response of the prior art optical gate reduce considerably its usefulness in multiplexing systems in which the pulse spacing is less than about 50 picoseconds and particularly in the aforementioned systems in which the pulse spacing could very well be only a fraction of a picosecond.

Aside from multiplexing, however, the rise time limitations of prior art optical gates also reduces their effectiveness in other applications such as sampling for subpicosecond intervals of time.

It is one object of the present invention to optically induce useful birefringence in solid materials.

It is another object of this invention to provide an optical gate having subpicosecond rise time.

SUMMARY OF THE INVENTION

These and other objects are accomplished in accordance with an illustrative embodiment of the invention, an optical gate utilizing a solid material in which birefringence is optically induced. For example, the solid material may be disposed between a pair of polarizers. An optical signal to be gated is made incident on one of the polarizers and is then transmitted through the solid material coincident with an optical control pulse illustratively of subpicosecond duration and high power density. The optical control pulse induces birefringence in the material, thereby causing the polarization of the signal to be changed, preferably by 90°, and the signal to be either absorbed or transmitted depending on whether the polarizers were originally parallel or crossed, respectively.

The solid materials (e.g., germanium, glass) have intrinsic rise times of the order of $10^{-15}$ seconds, but the rise of the optical gate as a whole appears to be limited by the rise time of the optical control pulse which at present may be as short as a fraction of a picosecond. Thus, in the present invention the rise time of the gate is either about $10^{-15}$ seconds or the rise time of the control pulse, whichever is longer.

Various devices, including optical samplers, demultiplexers, amplitude modulators and others utilizing the aforementioned properties are described hereinafter.

BRIEF DESCRIPTION OF THE DRAWING

The above and other objects of the invention, together with its various features and advantages, can be more easily understood from the following more detailed description taken in conjunction with the accompanying drawing, in which.

DETAILED DESCRIPTION

In accordance with the present invention, a high-intensity (e.g., 20 gigawatt/cm$^2$), plane polarized control signal passes through an isotropic solid and optically induces therein changes in its refractive index. These changes, as will be described hereinafter, affect the polarization of a second, usually less intense (e.g., 100 times smaller), optical signal which is also transmitted through the solid material. The latter signal constitutes the signal to be gated. The refractive index change for signal light polarized parallel to the electrical field of the control signal in general differs from the refractive index change for light polarized normal to this field. The resulting birefringence, or net change in index of refraction between the changes in the parallel and normal directions, is proportional to the product of the nonlinear index of the solid material and the square of the peak electrical field of the control signal.

By way of illustration, a picosecond optical control pulse having a peak power density of 22 gigawatts/cm$^2$, which corresponds to a peak optical field of $4.07 \times 10^6$ volts/cm, induces in glass, having a nonlinear index of about $2 \times 10^{-13}$ electrostatic units, a birefringence of about $1.84 \times 10^{-5}$, which is considerable. Of course, materials with a higher nonlinear index, such as those listed below, will have even greater birefringence.

The following Table I lists the approximate non-linear indices and passbands of a group of solid materials particularly useful in accordance with the teachings of this invention. Each of these materials has an intrinsic rise time of about $10^{-15}$ seconds.

TABLE I

| Solid Material | Nonlinear Index ($\times 10^{-13}$ esu) | Passband (microns) |
| --- | --- | --- |
| Germanium | 8,000 | 1.8 – 23 |
| Silicon | 2,500 | 1.2 – 15 |
| Gallium Arsenide | 2,500 | 1.0 – 15 |
| Diamond | 600 | 0.25 – 80 |
| Strontium Titanate | 600 | 0.4 – 6 |
| Cuprous Chloride | 30 | 0.5 – 11 |
| Glass (heavy flint) | 30 | 0.4 – 4 |
| Glass (fused quartz; BK-7) | 2 | 0.12 – 4.5 |

In the case of germanium and silicon purity, single crystals are preferred.

Figure 1:
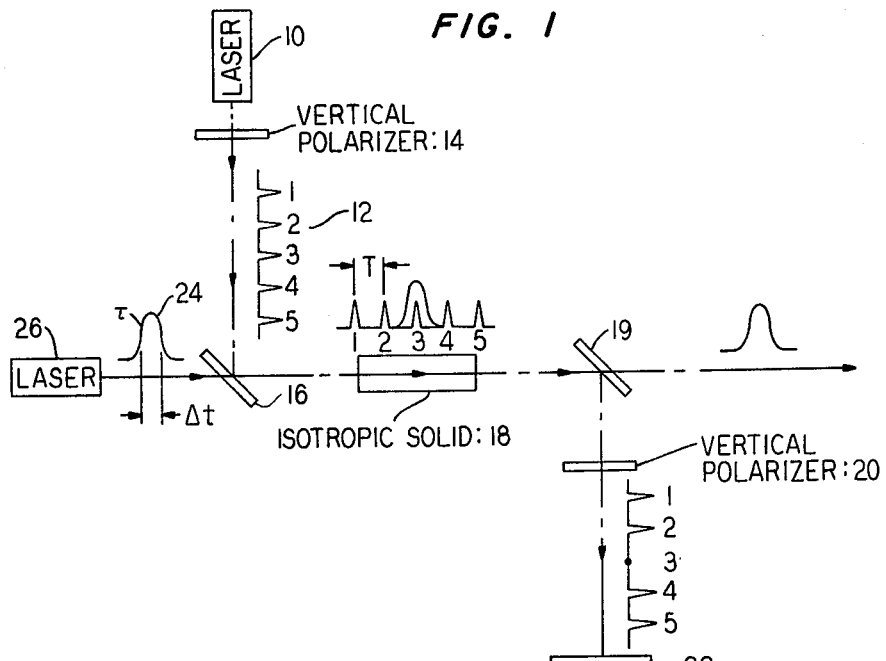
FIG. 1 is a schematic of an optical gate in accordance with an illustrative embodiment of the present invention.

With more specific reference now to FIG. 1, there is shown in accordance with the invention an optical gate, or amplitude modulator, comprising a laser 10 for generating a train of optical pulses 12, only five of which are shown for the purposes of simplicity. The laser 10 might be, for example, a mode locked Nd:glass or Nd:YAG laser which generates at 1.06 microns picosecond or subpicosecond pulses at nanosecond intervals. The pulse train 12 is transmitted through a vertical polarizer 14 and is then made incident upon partially reflecting mirror 16 which has a high reflectivity at the signal pulse wavelength (e.g., 0.53 microns). Of course, if laser 10 inherently generates linearly polarized radiation, then polarized 14 may be omitted. The pulses reflected from mirror 16 are directed through an isotropic solid 18 and then made incident upon a second partially reflecting mirror 19, which also has high reflectivity at the signal pulse wavelength. The signal pulses reflected from mirror 19 are transmitted through a second vertical polarizer 20 to a utilization device 22.

In general, however, polarizers 14 and 20 may be either parallel (i.e., both vertical or both horizontal) or crossed (i.e., one vertical and the other horizontal). In the parallel case, signal pulses are transmitted through the gate only if their polarization is unchanged in solid 18, whereas in the crossed case, signal pulses are transmitted only if their polarization is changed in solid 18.

In the case of parallel polarizers, therefore, and in the absence of optically induced birefringence in solid 18, the signal pulses, vertically polarized by polarizer 14, will pass through solid 18 with essentially no change in their polarization and, consequently, will be transmitted through vertical polarizer 20 to utilization device 22. To encode the pulse train 12 with information, a high intensity, subpicosecond control pulse 24 generated by laser 26 is transmitted through mirror 16 to be coincident in solid 18 with a preselected signal pulse, shown illustratively to be signal pulse 3. As described previously, the control pulse optically induces birefringence in the solid 18, thereby causing the vertical polarization of signal pulse 3 to be changed from vertical to horizontal.

Figure 3:
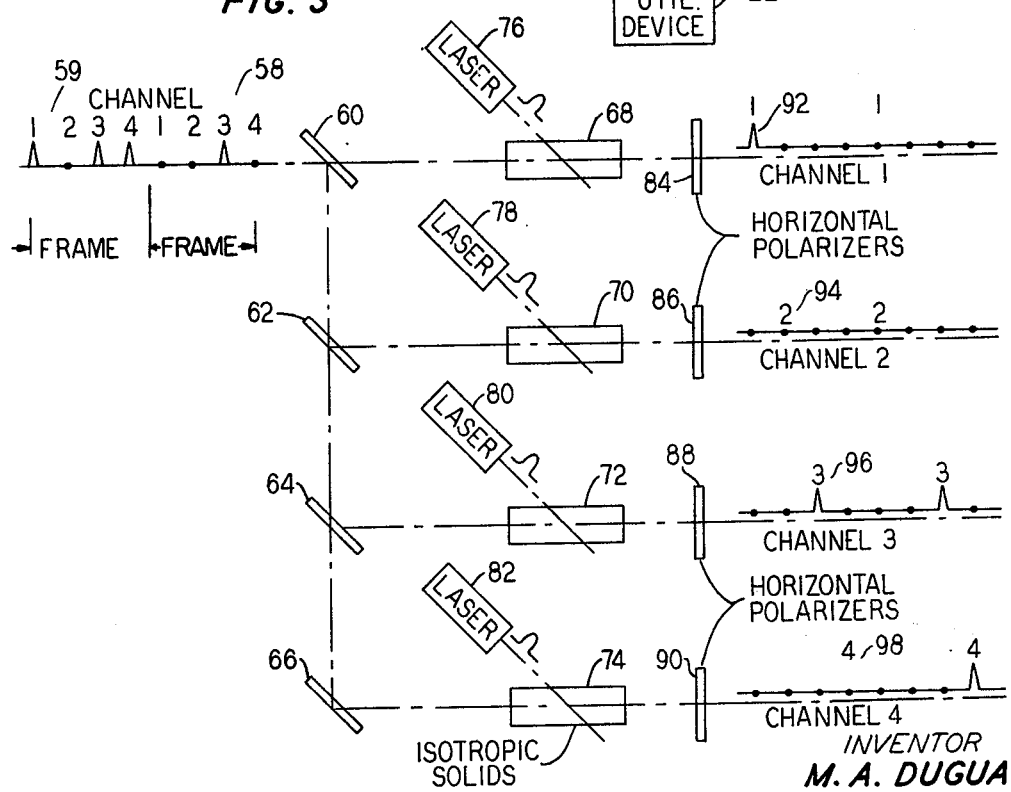
FIG. 3 is a schematic of a demultiplexer in accordance with a third embodiment of the invention.
Figure 2:
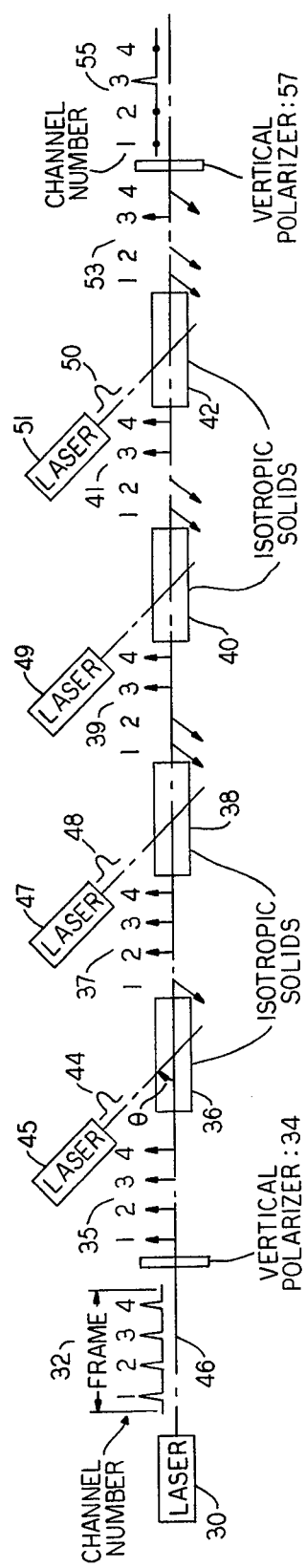
FIG. 2 is a schematic of a multiplexer in accordance with another embodiment of the invention.

In the embodiment of FIG. 1, where the signal and control pulses traverse the solid along colinear paths, it is preferred that this wavelength of the control pulse be different from that of the signal pulses in order that beam-splitter 19 be able to direct selectively the signal pulses to utilization device 22. Where, however, the use of the same wavelengths for both signal and control pulses is desired, then a noncolinear arrangement as shown in FIGS. 2 and 3 may be employed.

It should be noted here that the polarization of the signal pulse is technically not rotated, rather it changes continuously from vertical to elliptical (in which the major axis of the ellipse is vertical), to circular, to elliptical (in which the major axis of the ellipse is horizontal) and finally to horizontal, thereby effecting a 90° change in the polarization. To maximize this change in polarization it is preferable that the polarization of the control pulse 24 be at 45° to the vertical polarization of the signal pulse. Moreover, to effect the preferred 90° change in polarization, it is desirable that the signal pulse intensity be considerably less intense than the control pulse intensity so that the signal pulses induces only a negligible amount of birefringence in solid 18. In addition, since the phase retardation in a given solid is proportional to the product of the length of the solid in the direction of light propagation and the power density, these parameters are chosen to produce the desired 90° change in polarization. For example, in glass (BK-7), the length is about 1.44 cm for a control pulse peak power density of about 22 gigawatts/cm$^2$ (at about 1.06$\mu$) and a signal pulse power density of about 0.2 gigawatts/cm$^2$ (at 0.53$\mu$). Typically, the solid body is 1 centimeter square in cross section.

Thus, signal pulse 3, which is horizontally polarized after passing through solid 18, is not transmitted through vertical polarizer 20 and, as a consequence, utilization device 22 receives only signal pulses 1, 2, 4 and 5 in accordance with information being transmitted.

The rise time $\tau$ of the control pulse 24, typically in the subpicosecond range, essentially dictates the switching speed or rise time of the optical gate as a whole. The pulse width $\Delta t$ of the control pulse may also be of picosecond duration provided, of course, that $\Delta t$ is less than T, the pulse spacing of the signal pulse train 12. Otherwise, individual signal pulses would not be selectively encoded. Such control pulses are readily generated, for example, by an Nd:glass laser.

The optical gate, and accordance with the present invention, can readily be adapted for use in various types of optical communication systems. As shown in FIG. 2, the optical gate is utilized in a multiplexer. In this embodiment, laser 30 generates a train of interleaved pulses 32 which comprise illustratively a plurality of four-channel frames, each channel initially containing an optical pulse of typically subpicosecond duration separated from the pulse of the adjacent channel by typically a subpicosecond interval. The output of laser 30 is passed through a vertical polarizer 34 and then transmitted through a plurality of isotropic solids 36, 38, 40 and 42, four of which are shown to correspond to the four channels of the multiplex system. It is, of course, to be understood that each of the solids might readily have their entrance and exit faces cut at Brewster's angle and/or provided with an antireflection coating to reduce optical losses. Moreover, since the optical losses per stage are extremely small, it is quite possible to have large numbers of such solids aligned along a common axis for multiplexing a system consisting of hundreds of channels, for example.

Considering then the single four-channel frame 32, with the understanding that the following description applies equally as well to all other frames, information is encoded on each of channels 1 to 4 by optically inducing birefringence sequentially in the solids 36, 38 40 and 42, respectively, as the corresponding channel pulse passes therethrough. At 35, the pulses of channels 1 to 4 are shown to be all vertically polarized and to be incident upon solid 36. A laser 45 capable of generating a high intensity, subpicosecond control pulse is disposed at an angle $\theta$ to the common optic axis 46 and is adapted to transmit a control pulse 44 through the solid 36 coincident with the signal pulse corresponding to channel 1. In accordance with information to be transmitted, therefore, and by means of timing circuitry not shown, but well known in the art, the polarization of the channel 1 signal pulse changes by 90° from vertical to horizontal. Similarly, control pulses 48 and 50 generated by lasers 47 and 51, respectively, change the polarizations of the pulses of channels 2 and 4 from vertical to horizontal. However, laser 49, again utilizing appropriate timing circuitry well known in the art, generates no control pulse coincident with the signal pulse of channel 3. Consequently, the polarization of that signal pulse is not changed and, therefore, remains vertical after passing through solid 40 as shown at 41. It is clear, therefore, that the vertical and horizontal polarizations of the signal pulses shown at 53 carry information in binary form. It is possible, of course, to transmit the information through a medium in this form. However, any residual birefringence in such a transmission medium might introduce spurious rotation of the polarizations which would, of course, constitute a form of noise. Alternately, therefore, the signal at 53 may be converted to an amplitude modulated form by passing the signal at 53 through a vertical polarizer 57. Thus, the exemplary four-channel frame initiated at 32 with a single pulse in each channel 1 to 4 is converted to a frame with a pulse in channel 3 only.

In the embodiment of FIG. 2, care should be exercised to prevent excessive time delay or phase retardation between the control pulse and the corresponding signal pulse. Such time delay, which causes the control and signal pulses to spatially separate, may arise from group velocity mismatch produced by signal and control pulses at different wavelengths, or it may arise from a difference in path lengths in the solid of the signal and control pulses. This path difference is caused by the angle $\theta$ between the directions of propagation of the respective pulses. In both cases, it is desirable that the spatial separation, or "slippage," be less than the spacing between adjacent channel signal pulses, so that a control pulse of a particular channel will not affect the polarization of either the preceding or succeeding channel pulse. In this regard, it is preferable that the angle $\theta$ be less than about 10°.

In a manner analogous to that described above, consecutively encoded frames 58 and 59 may be demultiplexed as shown in FIG. 3. The amplitude modulated frames each consist of four channels with only channel 3 containing a pulse in frame 58 and only channels 1, 2 and 4 containing a pulse in channel 59. These pulses are all vertically polarized. However, any distortion introduced by the transmission medium can be corrected by passing the pulses through a vertical polarizer (not shown) prior to incidence on the gates. Each frame is then made incident upon a plurality of beamsplitters 60, 62, 64 and 66 which divide the two-frame signal into four components each of which are made incident upon an isotropic solid 68, 70, 72 and 74, respectively. Lasers 76, 78, 80 and 82 are timed by well-known means to be selectively coincident with the corresponding signal pulses (if any) in channels 1, 2, 3 and 4. Thus, thE polarization of the signal pulse of channel 3 of frame 58 is rotated from vertical to horizontal and passed through horizontal polarizer 88, resulting in recovering of the information in that channel, as shown at 92. CHannels 1, 2 and 4 of frame 58 are decoded with the outputs at 94, 96, and 98 being essentially the absence of a signal pulse in each of those channels. Channels 1 to 4 of frame 59 may be similarly decoded.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. An optical device comprising
    a body of a solid material in which birefringence can be optically induced, said body being disposed to intercept an optical information signal,
    means for generating an optical control pulse of substantially high power density and of picosecond duration or less,
    means for applying to said body the optical control pulse coincident with the transmission of at least a portion of the information signal through said body to induce the birefringence in a sense yielding a change in polarization of the portion of the information signal.

2. The optical device of claim 1 wherein said solid material is selected from the group consisting of germanium, silicon, gallium arsenide, diamond, strontium titanate, cuprous chloride and glass.

3. The device of claim 1 for use in modulating the optical information signal comprising
    means for polarizing the information signal in a first direction,
    means for polarizing the control pulse at an angle of about 45° to said first direction,
    means for making the polarized control pulse and the polarized information signal to be coincident and to overlap in at least a portion of said body, thereby to cause the polarization of the information signal to change from said first direction to a second direction at approximately 90° to said first direction.

4. The device of claim 3 in combination with means for selectively transmitting the optical information signal polarized in said first direction and for absorbing the information signal polarized in said second direction.

5. The device of claim 4 wherein the optical information signal comprises a train of optical pulses of uniform spacing T and wherein the control pulse comprises an optical pulse of duration less than T.

6. The device of claim 5 wherein T is a subpicosecond time interval.

7. The device of claim 4 for use as a multiplexer wherein the optical information signal comprises a train of uniformly spaced pulses, a subset thereof defining a frame and each pulse in said frame corresponding to a different channel, and in combination with
    a plurality of said bodies disposed along a common optic axis, each of said bodies corresponding to a separate one of said channels,
    the information signal being transmitted along said common axis, and
    means for selectively applying a control pulse to each of said bodies coincident with the passage therethrough of the information pulse of a corresponding channel.

8. The device of claim 4 for use as a demultiplexer wherein the optical information signal comprises a train of encoded pulses, a subset thereof defining a frame and each pulse position in said frame corresponding to a different channel, and in combination with
    means for dividing the information signal into a plurality of paths, each of said paths corresponding to a separate channel,
    a plurality of said bodies, each of said paths having disposed therein one of said bodies,
    means for selectively applying a control pulse to each of said bodies coincident with the passage therethrough of the information pulse of a corresponding channel, and
    means for transmitting in each of said paths only the information pulses which have been priorly made coincident with a corresponding control pulse.

* * * * *